(12) United States Patent
Ma et al.

(10) Patent No.: US 7,672,390 B2
(45) Date of Patent: Mar. 2, 2010

(54) LOW COMPLEXITY SCALABLE MIMO DETECTOR AND DETECTION METHOD THEREOF

(75) Inventors: Hsi Pin Ma, Hsinchu (TW); Chung Wen Yu, Taoyuan County (TW)

(73) Assignee: National Tsing Hua Univerisity, Hsinchu (TW)

( * ) Notice: Subject to any disclaimer, the term of this patent is extended or adjusted under 35 U.S.C. 154(b) by 775 days.

(21) Appl. No.: 11/463,207

(22) Filed: Aug. 8, 2006

(65) Prior Publication Data

US 2008/0037677 A1    Feb. 14, 2008

(51) Int. Cl.
*H04L 1/02* (2006.01)
(52) U.S. Cl. ..................................... 375/267
(58) Field of Classification Search ................. 375/148, 375/260, 262, 267, 285, 346–350
See application file for complete search history.

(56) References Cited

U.S. PATENT DOCUMENTS

| | | | | |
|---|---|---|---|---|
| 6,127,971 | A * | 10/2000 | Calderbank et al. | 342/368 |
| 6,934,320 | B2 * | 8/2005 | Tujkovic et al. | 375/146 |
| 7,215,718 | B1 * | 5/2007 | Calderbank et al. | 375/299 |
| 7,274,751 | B2 * | 9/2007 | Tarokh et al. | 375/299 |

OTHER PUBLICATIONS

I. E. Telatar, "Capacity of multi-antenna Gaussian channels," Tech. Rep., AT&T Bell., 1995.

2. Syed Aon Mujtaba. (May 2005). TGn Sync Proposal Technical Specification. Agere Systems Inc., U.S.A. [Online]. Available: http://www.tgnsync.org/techdocs/11-04-0889-06-000n-tgnsync-proposal-technical-specification.doc.

G. J. Foschini, "Layered space-time architecture for wireless communication in a fading environment when using multiple antennas," Bell Labs Technical Journal, vol. 1, No. 2, pp. 41-59, Autumn 1996.

G. J. Foschini and M. J. Gans, "On limits of wireless communications in a fading environment when using multiple antennas," Wireless Personal Communications, 1998, vol. 6, No. 3, pp. 311-335.

W. J. Choi, R. Negi and J. M. Cioffi, "Combined ML and DFE decoding for the V-BLAST system," in Proc. IEEE International Conference on Communications 2000, New Orleans, LA, Jun. 2000. pp. 1243-1248.

(Continued)

*Primary Examiner*—Khanh C Tran
(74) *Attorney, Agent, or Firm*—WPAT, P.C.; Anthony King (57) ABSTRACT

A scalable Multiple-Input Multiple-Output (MIMO) detector, comprises an ordering block, a group interference suppression block, a core detector and a residual detector. The ordering block determines an order of the columns of a channel matrix including received streams based on the power thereof. The group interference suppression block coupled to the ordering block groups received streams into a core part and a residual part, the core part including a first received stream and a second received stream corresponding to the first two columns of the channel matrix in the order, the first received stream and the second received stream forming a received signal vector, and the residual part including the rest of the received streams. The core detector detects the core part based on a 2×2 Simplified Maximum Likelihood (SML) detection. The residual detector detects the residual part by Vertical Bell Laboratories Layered Space Time (VBLAST) detection.

10 Claims, 6 Drawing Sheets

OTHER PUBLICATIONS

W.J. Choi, K. W. Cheong and J. M. Cioffi, "Iterative soft interference cancellation for multiple antenna systems," in Proc. IEEE Wireless Communications and Networking Conference 2000, Chicago, IL, Sep. 2000. pp. 304-309.

A. Stefanov and T. Duman, "Turbo-coded modulation for systems with transmit and receive antenna diversity over block fading channels: system model, decoding approaches, and practical considerations," IEEE Journal on Selected Areas in Communications, vol. 48, pp. 1347-1359, Aug. 2000.

M. K. Abdul Aziz, P. N. Fletcher and A. R. Nix, "Performance analysis of IEEE 802.11n solutions combining MIMO architectures with iterative decoding sub-optimal ML detection via MMSE and Zero forcing GIS solutions," in Proc. IEEE Wireless Communications and Networking Conference 2004, Mar. 2004. vol. 3, pp. 1451-1456.

Hozun Sung, Kwang Bok Lee and Jee Woong Kang, "A simplified maximum likelihood detection scheme for MIMO systems," in Proc. IEEE 58th Vehicular Technology Conference, Oct. 2003, vol. 1, pp. 419-423.

Chin, W. H., Constantinides, A. G. and Ward, D. B., "Parallel multistage detection for multiple antenna wireless systems," Electronics Letters, vol. 38 Issue: 12, Jun. 6, 2002, pp. 597-599.

Lan Yang, Ming Chen, Shixin Cheng and Haifeng Wang, "Combined maximum likelihood and ordered successive interference cancellation grouped detection algorithm for multistream MIMO," IEEE Eighth International Symposium on Spread Spectrum Techniques and Applications, Aug. 30-Sep. 2, 2004, pp. 250-254.

Yang, L., Cheng, S., and Wang, H., "Partial decision ordered successive interference cancellation detection algorithm for VBLAST," IEEE International Symposium on Personal, Indoor and Mobile Redio Communications, Sep. 5-8, 2004, vol. 3, pp. 1564-1567.

Lan Yang, Ming Chen, Shinix Cheng and Haifeng Wang, "Partial maximum likelihood receiver with instantaneous SNR-based subspace search for multistream MIMO," in Proc. IEEE 60th Vehicular Technology Conference, Sep. 2004, vol. 3, pp. 2664-2667.

* cited by examiner

LOW COMPLEXITY SCALABLE MIMO DETECTOR AND DETECTION METHOD THEREOF

BACKGROUND OF THE INVENTION (A) Field of the Invention

The present invention is related to a Multiple-Input Multiple-Output (MIMO) detector and the detection method thereof, and more specifically, to a low complexity scalable MIMO detector and the detection method thereof.

(B) Description of the Related Art

Previous researches have shown that the channel capacity increases linearly with the number of transmitter and receiver antennas. MIMO communication systems can increase the channel capacity without additional bandwidth. Therefore, MIMO is promising to achieve high data rate requirements by spatial multiplexing technology.

There are many MIMO receiving technology for spatial multiplexing. These technologies can be divided into linear and non-linear detection methods. It is well known that the linear detection methods have lower complexity than non-linear ones. However, the linear detection methods have poor performance. Maximum-Likelihood (ML) detector and Vertical Bell Laboratories Layered Space Time (VBLAST) detector are two famous non-linear MIMO detection methods. Both technologies can provide performance gain over non-linear MIMO systems at the same data rate. However, the complexity of ML detection increases rapidly with the number of the antennas and the constellation size. In other words, the ML detection is not practical in large MIMO systems. The VBLAST detection was proposed by Foschini in 1996, and is also called Ordered Successive Interference Cancellation (OSIC) as its detection process.

Both of the ML detector and the VBLAST detector have their own advantages. The ML outperforms to VBLAST, while VBLAST has less computational complexity than ML. Previous researches tried to take advantages of these two detection methods, respectively. However, the results show the performance and complexity are in trade-off between ML and VBLAST, and the complexity is still high.

SUMMARY OF THE INVENTION

The objective of the present invention is to provide a MIMO detector, which can reduce the complexity without sacrificing the performance. In addition, the MIMO detector of the present invention can be scalable to large MIMO dimensions based on basic modules.

The matrix inversion operation takes the most complexity in the VBLAST detection process. It is proportional to the power of three of the matrix dimension. Therefore, avoiding the matrix inversion can reduce a lot of complexity.

In accordance with the present invention, the large MIMO system is divided into several small sub-modules with fewer dimensions to avoid huge search set in ML detection or large dimension matrix operation in VBLAST detection. The dimension of the basic block is limited to 2×2, and the matrix can be done by the following simple formula without complicated operation.

$$A = \begin{bmatrix} a_{11} a_{12} \\ a_{21} a_{22} \end{bmatrix} \qquad A^{-1} = \frac{1}{a_{11}a_{22} - a_{12}a_{21}} \begin{bmatrix} a_{11} & -a_{12} \\ -a_{21} & a_{22} \end{bmatrix}$$

The computational complexity in the proposed scheme can then be reduced significantly without performance loss. Moreover, the proposed scheme is easily scalable to higher dimension based on the proportional regular modules. This helps build a large MIMO detector easily.

Accordingly, a scalable MIMO detector is disclosed. The MIMO detector comprises an ordering block, a group interference (GIS) block, a core detector, an interference canceling (IC) block and a residual detector. The ordering block determines an order of the columns of a channel matrix including received streams based on the power of each column of the channel matrix. The GIS block is coupled to the ordering block for grouping the received streams into a core part and a residual part, the core part including a first received stream and a second received stream corresponding to the first two columns of the channel matrix in the order, the first received stream and the second received stream forming a received signal vector, and the residual part including the rest of the received streams. The core detector is coupled to the GIS block for detecting the core part based on a 2×2 ML detection. The IC block is coupled between the core detector and the residual detector for subtracting the core part from all of the received streams. The residual detector detects the residual part by VBLAST detection.

The first received stream and the second received stream are received from a first receiver antenna and the second receiver antenna, respectively. Each of the first transmitter antenna and the second transmitter antenna has four constellation points for QPSK modulation, sixteen constellation points for 16-QAM modulation, and sixty-four constellation points for 64-QAM modulation, respectively. The 2×2 ML detection for the core part includes the steps of (1) determining a constellation point of the second transmitter antenna most likely corresponding to each constellation point of the first transmitter antenna, and each constellation point of the first transmitter antenna and the corresponding constellation point of the second transmitter antenna thereof form a candidate vector, thereby four candidate vectors being formed; and (2) finding a minimum distance between the received signal vector and multiplication of the channel matrix and each candidate vector, and the candidate vector corresponding to the minimum distance being the detection solution of core part.

The proposed architecture is easily scalable to large MIMO dimensions based on the basic modules. The proposed MIMO detector outperforms other ones with low complexity and has 80% complexity reduction and 5 dB performance gain in comparison with VBLAST detector in an 8×8 MIMO communication system.

DETAILED DESCRIPTION OF THE INVENTION

The present invention will be explained with the appended drawings to clearly disclose the technical characteristics of the present invention.

A MIMO system comprises N transmitter antennas and M receiver antennas. The number of receiver antennas is equal to or large than the number of transmitter antennas, i.e., M≧N. There are N spatial transmitted streams in the transmitter. Each spatial transmitted stream is directly mapped to each transmitter antenna. The baseband system model in fading environment is modeled by $$r = Hs + n$$

where r is an M×1 received signal vector, s is an N×1 transmitted signal vector, n is an M×1 complex noise vector, and H denotes an M×N channel matrix.

Figure 1:
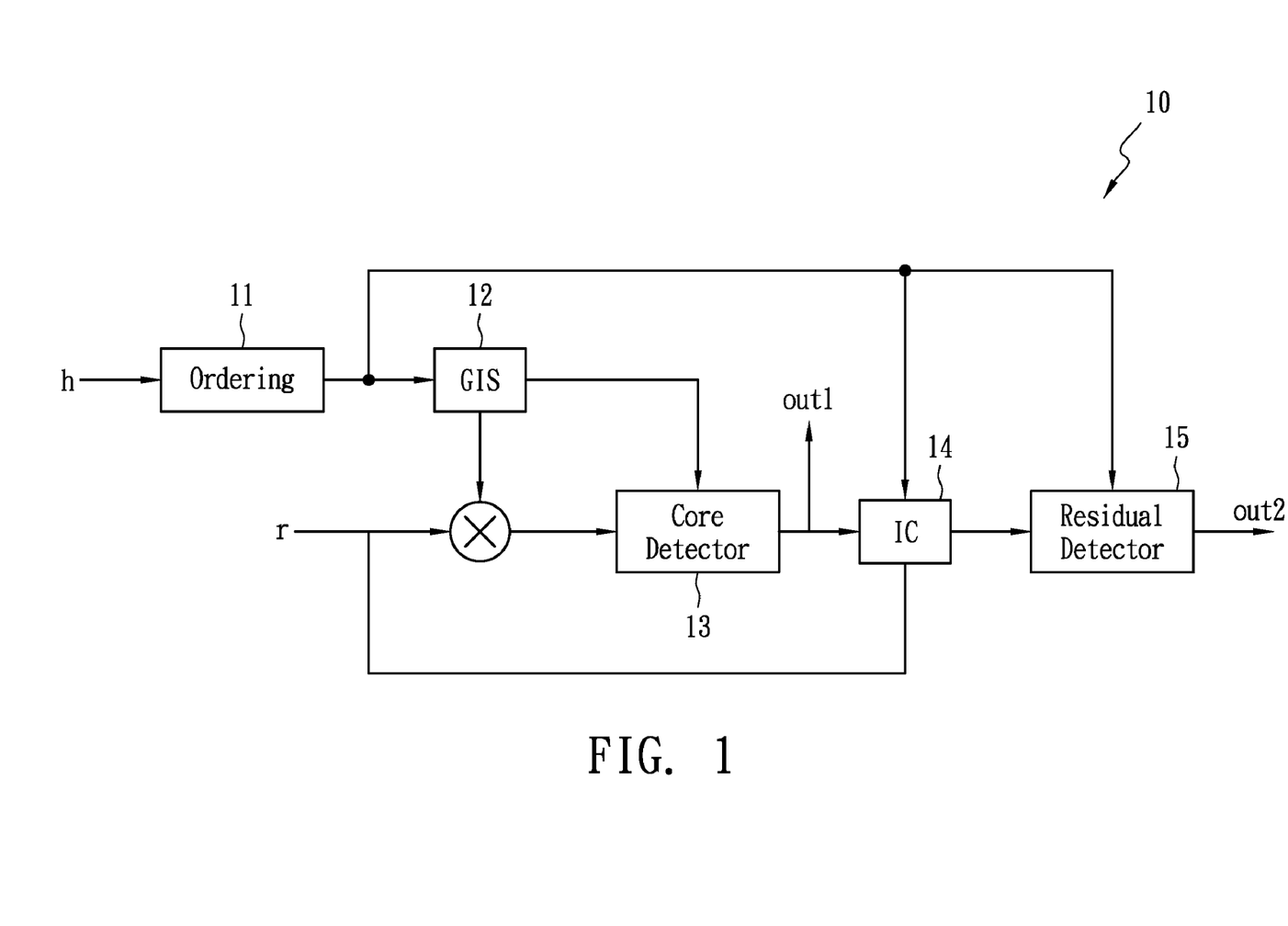
FIG. 1 illustrates a basic architecture of the scalable MIMO detector in accordance with the present invention.

FIG. 1 illustrates a basic architecture of the scalable MIMO detector in accordance with the present invention. A scalable MIMO detector 10 comprises an ordering block 11, a Group Interference Suppression (GIS) block 12, a core detector 13, an Interference Canceling (IC) block 14 and a residual detector 15. The operation of the above-mentioned device is described as follows.

Ordering:

The ordering block 11 determines a detection order, which descends by the received power.

$$\|(H)_{n_1}\|^2 \geq \|(H)_{n_2}\|^2 \geq \ldots \|(H)_{n_N}\|^2$$

where $(H)_i$ is the i-th column of a channel matrix H, and $(n_1, n_2, \ldots, n_N)$ is the detection order and one permutation of $(1, 2, \ldots, N)$.

Group Interference Suppression (GIS):

GIS technology performing in the GIS block 12 is intended to limit the objects for processing. A 2×2 detector is selected as the minimum unit for MIMO systems, thus the two received streams corresponding to the first two columns of the channel matrix after ordering are selected for processing, others are deemed interferences and ignored first. For instance, a 4×4 MIMO system will be divided into two groups, one is 2×2 system including the first two received streams called core part and the rest is a 4×2 system called residual part. And only the core part will be resolved first.

Core Part:

The core part selected from GIS is multiplied by the received stream vector r and then is transmitted to the core detector 13 so as to detect an optimum solution. The solution is obtained by a simplified ML solution instead of a traditional one in accordance with the present invention.

The traditional ML solution is obtained by the following equation.

$$\tilde{s} = \arg\min_{s \in C^N} \|r - Hs\|^2$$

where s and $\tilde{s}$ denotes the transmitted stream vector and estimated stream vector, respectively; r is the received stream vector. The number of possible symbol combinations for search is $C^N$, where C is the constellation size of the possible transmitted streams.

For instance, if the transmitted stream is $$\begin{bmatrix} 1+j \\ 1+j \end{bmatrix},$$

channel matrix H is $$\begin{bmatrix} 1.7+0.5j & 0.3-1.2j \\ 0.1-0.8j & 0.5+0.6j \end{bmatrix},$$

and noise is $$\begin{bmatrix} 0.01+0.03j \\ 0.02-0.04j \end{bmatrix},$$

the receive signal vector r is $$\begin{bmatrix} 1.7+0.5j & 0.3-1.2j \\ 0.1-0.8j & 0.5+0.6j \end{bmatrix} \begin{bmatrix} 1+j \\ 1+j \end{bmatrix} + \begin{bmatrix} 0.01+0.03j \\ 0.02-0.04j \end{bmatrix} = \begin{bmatrix} 2.71+1.33j \\ 0.82+0.36j \end{bmatrix}.$$

Because H is a 2×2 channel matrix, M=2, N=2 and C=4. Therefore, there are 16 symbol combinations of $\|r-Hs\|^2$ in total.

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1+j \\ 1+j \end{bmatrix} \right\|^2 = 0.0548$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1+j \\ 1-j \end{bmatrix} \right\|^2 = 2.9187$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1+j \\ -1+j \end{bmatrix} \right\|^2 = 2.8940$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1+j \\ -1-j \end{bmatrix} \right\|^2 = 4.1099$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1-j \\ 1+j \end{bmatrix} \right\|^2 = 3.9236$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1-j \\ 1-j \end{bmatrix} \right\|^2 = 4.4442$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} 1-j \\ -1+j \end{bmatrix} \right\|^2 = 3.1507$$

$$\vdots$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} -1-j \\ -1+j \end{bmatrix} \right\|^2 = 4.6034$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix} \begin{bmatrix} -1-j \\ -1-j \end{bmatrix} \right\|^2 = 6.2759$$

in which the minimum distance $(\min\|r-Hs\|^2)$ is 0.0548, which corresponds to $$\bar{s} = \begin{bmatrix} 1+j \\ 1+j \end{bmatrix}.$$

Therefore, $$\begin{bmatrix} 1+j \\ 1+j \end{bmatrix}$$

is the ML solution.

However, the computational complexity for the traditional ML search is still huge, especially in large constellation. The search order $O(C^N)$ is equal to $4^2=16$.

Alternatively, a simplified ML detection method is proposed to reduce the search space according to the present invention. The detailed detection is described as the following two steps.

Step 1: Searching Set Decision:

As mentioned above, the traditional ML detection needs to go through all candidates in searching set formed by $(C^N)$ vectors. These vectors are written as

[symbol_a symbol_b]$^T$, where symbol_a and symbol_b stand for the constellation points at the first and second transmitter antennas, respectively.

In the simplified ML detection method, the number of the vectors in the searching set is reduced to C. These C vectors are determined by the following procedures. This method assumes that the received power of the first transmitter antenna is larger than or equals to that of the second transmitter antenna, and symbol_a is detected correctly first. Then, the corresponding symbol_b for each symbol_a is calculated by the concept of interference canceling. Accordingly, C vectors in total are chosen because there are C possible constellation points for symbol_a. These C vectors form the simplified ML searching space, i.e., the search order is reduce to C.

Step 2: Finding the Closet Solution:

After deciding the search space, the Euclidean distances between the received signal vector and multiplication of channel matrix and each transmitted signal vector in the searching space are calculated. Afterwards, the best solution is chosen by comparing and finding where the minimum Euclidean distance occurs.

The detection of the above example by the simplified ML detection of the present invention is shown as below.

In step 1: If a first transmitter antenna transmits [1+j], [1+j] is most likely to correspond to the constellation point [1+j] of a second transmitter antenna as shown below.

$$\begin{bmatrix} 0.3-1.2j \\ 0.5+0.6j \end{bmatrix}^H \left( \begin{bmatrix} 2.71+1.33j \\ 0.82+0.36j \end{bmatrix} - [1+j]\begin{bmatrix} 1.7+0.5j \\ 0.1-0.8j \end{bmatrix} \right) =$$

$$[2.093+2.129j] \Rightarrow [1+j]$$

where $[\ ]^H$ denotes the conjugate transpose operation.

If the first transmitter antenna transmits [1−j], [1−j] is most likely to correspond to the constellation point [−1+j] of the second transmitter antenna as shown below.

$$\begin{bmatrix} 0.3-1.2j \\ 0.5+0.6j \end{bmatrix}^H \left( \begin{bmatrix} 2.71+1.33j \\ 0.82+0.36j \end{bmatrix} - [1-j]\begin{bmatrix} 1.7+0.5j \\ 0.1-0.8j \end{bmatrix} \right) =$$

$$[-1.367+1.089j] \Rightarrow [-1+j]$$

If the first transmitter antenna transmits [−1+j], [−1+j] is most likely to correspond to the constellation point [1+j] of the second transmitter antenna as shown below.

$$\begin{bmatrix} 0.3-1.2j \\ 0.5+0.6j \end{bmatrix}^H \left( \begin{bmatrix} 2.71+1.33j \\ 0.82+0.36j \end{bmatrix} - [-1+j]\begin{bmatrix} 1.7+0.5j \\ 0.1-0.8j \end{bmatrix} \right) =$$

$$[1.053+5.589j] \Rightarrow [1+j]$$

If the first transmitter antenna transmits [−1−j], [−1−j] is most likely to correspond to the constellation point [−1+j] of the second transmitter antenna as shown below.

$$\begin{bmatrix} 0.3-1.2j \\ 0.5+0.6j \end{bmatrix}^H \left( \begin{bmatrix} 2.71+1.33j \\ 0.82+0.36j \end{bmatrix} - [-1-j]\begin{bmatrix} 1.7+0.5j \\ 0.1-0.8j \end{bmatrix} \right) =$$

$$[-2.407+4.549j] \Rightarrow [-1+j]$$

In Step 2: the Euclidean distances for the four most possible constellations are calculated, i.e., only four calculations are needed. Consequently, the search order is equal to 4.

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix}\begin{bmatrix} 1+j \\ 1+j \end{bmatrix} \right\|^2 = 0.0548$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix}\begin{bmatrix} 1-j \\ -1+j \end{bmatrix} \right\|^2 = 3.1507$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix}\begin{bmatrix} -1+j \\ 1+j \end{bmatrix} \right\|^2 = 3.9277$$

$$\left\| \begin{bmatrix} 2.71+1.33j \\ 0.82+0.36j \end{bmatrix} - \begin{bmatrix} 1.7+0.5j & 0.3-1.2j \\ 0.1-0.8j & 0.5+0.6j \end{bmatrix}\begin{bmatrix} -1-j \\ -1+j \end{bmatrix} \right\|^2 = 4.6034$$

Because 0.0548 is minimum among them, the corresponding $$\begin{bmatrix} 1+j \\ 1+j \end{bmatrix}$$

is the solution "out1" of the simplified ML detection.

In comparison with the traditional one, the simplified ML detection can reduce the search order from $C^N$ to C, thus the computational complexity can be significantly reduced.

Interference Canceling (IC):

Because the first two received streams after ordering are already detected in the core detector 13, the IC block 14 is configured to subtract the effects of the two detected received streams in the Core Part. Accordingly, the residual part is transmitted to and detected in the residual detector 15.

Residual Part:

The residual part is detected in the residual detector 15 by VBLAST method, and the detection is output as "out2."

Figure 2:
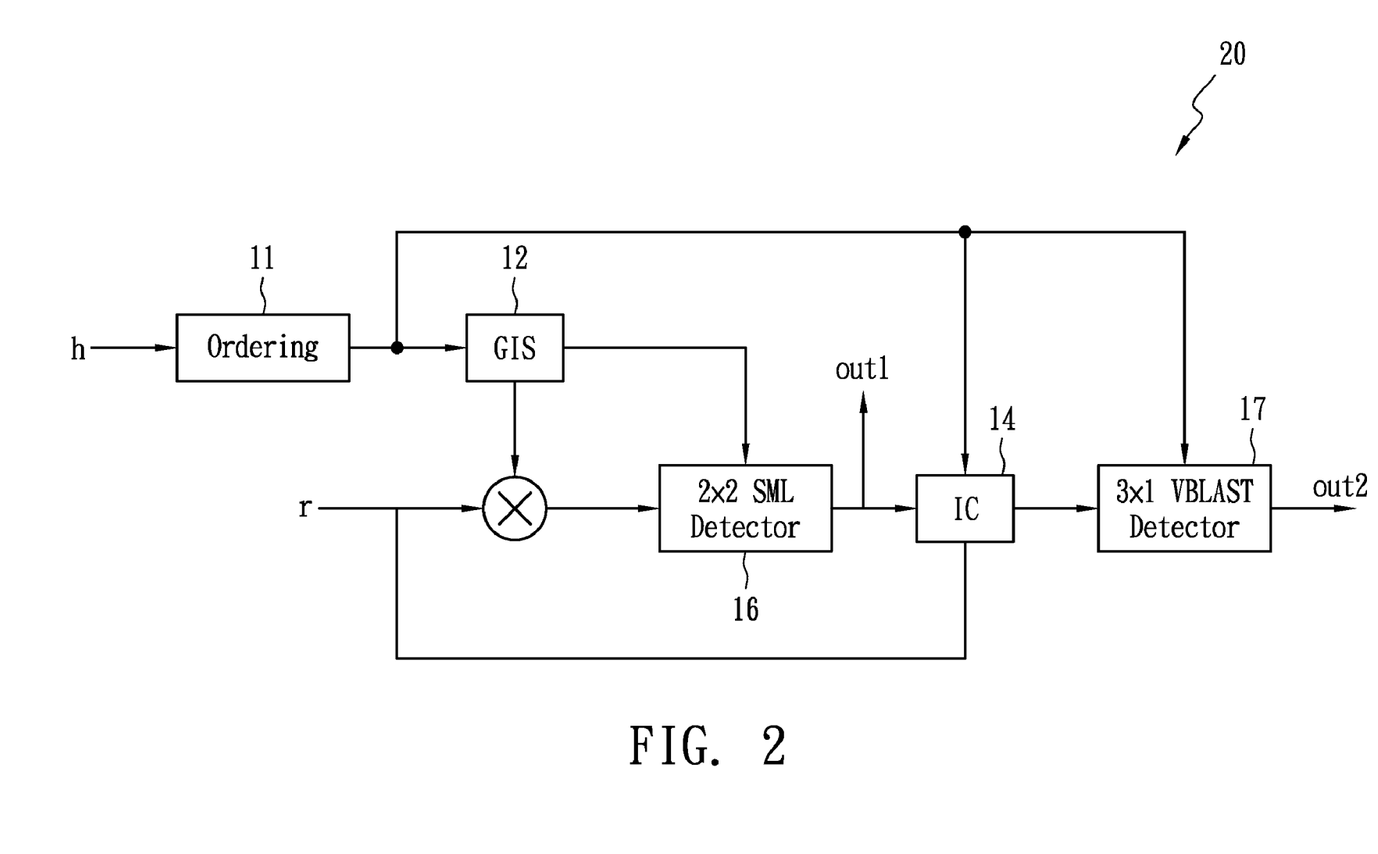
FIG. 2 illustrate a 3×3 MIMO detector in accordance with the present invention.

FIG. 2 illustrates a scalable MIMO detector 20 for a MIMO system comprising three transmitter antennas and three receiver antennas, i.e., a 3×3 system. The scalable MIMO detector 20 uses a 2×2 simplified ML (SML) detector 16 as the core detector to detect the received streams of the core part, and the solutions are "out1" outputted from the 2×2 SML detector 16. As a result, a 3×1 VBLAST detector 17 is used as the residual detector.

Figure 3:
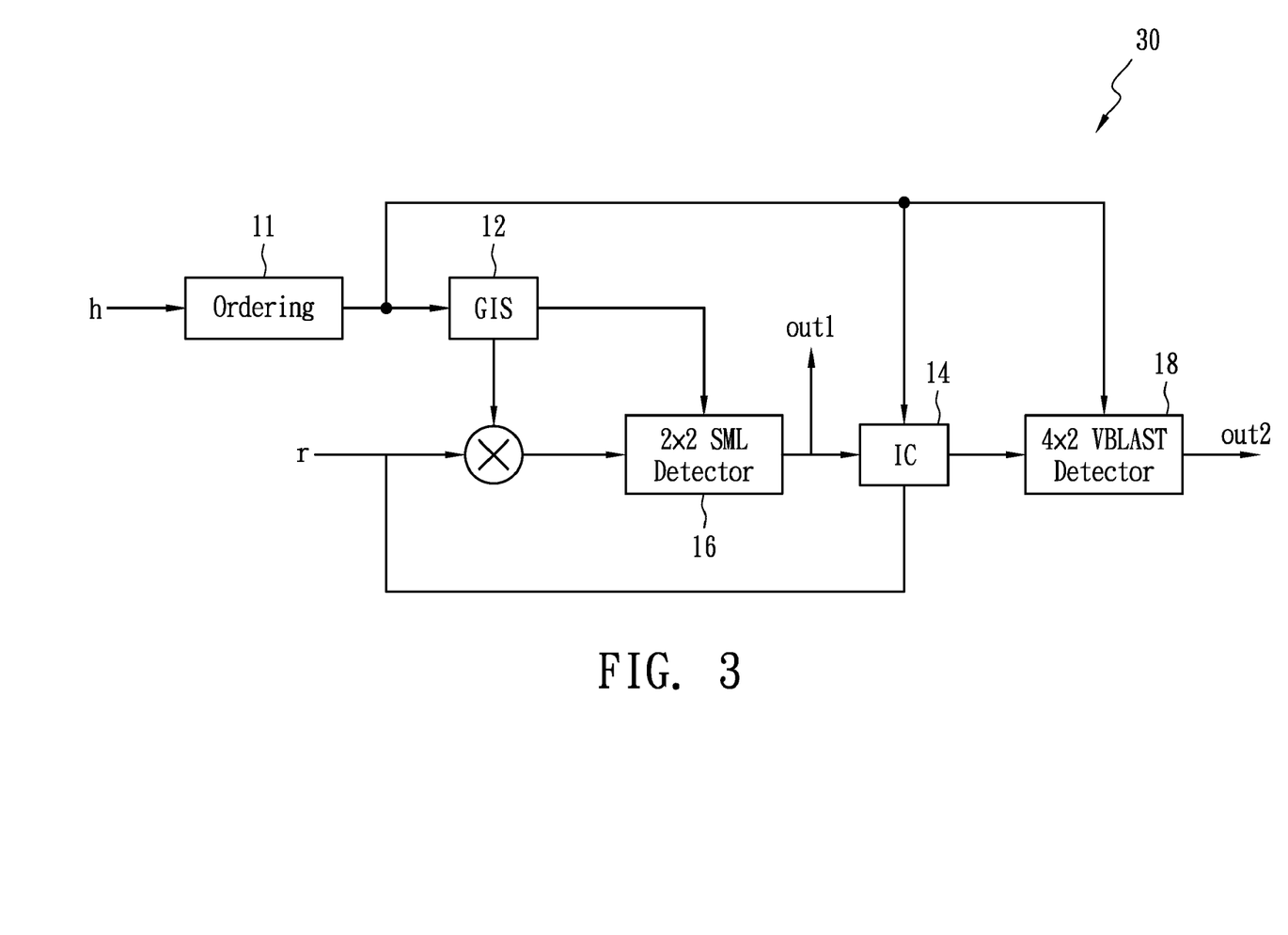
FIG. 3 illustrates a 4×4 MIMO detector in accordance with the present invention.

FIG. 3 illustrates a scalable MIMO detector 30 for a MIMO system comprising four transmitter antennas and four receiver antennas, i.e., a 4×4 system. The scalable MIMO detector 30 uses a 2×2 SML detector 16 as the core detector, and uses a 4×2 VBLAST detector 18 to detect the residual part.

Figure 4:
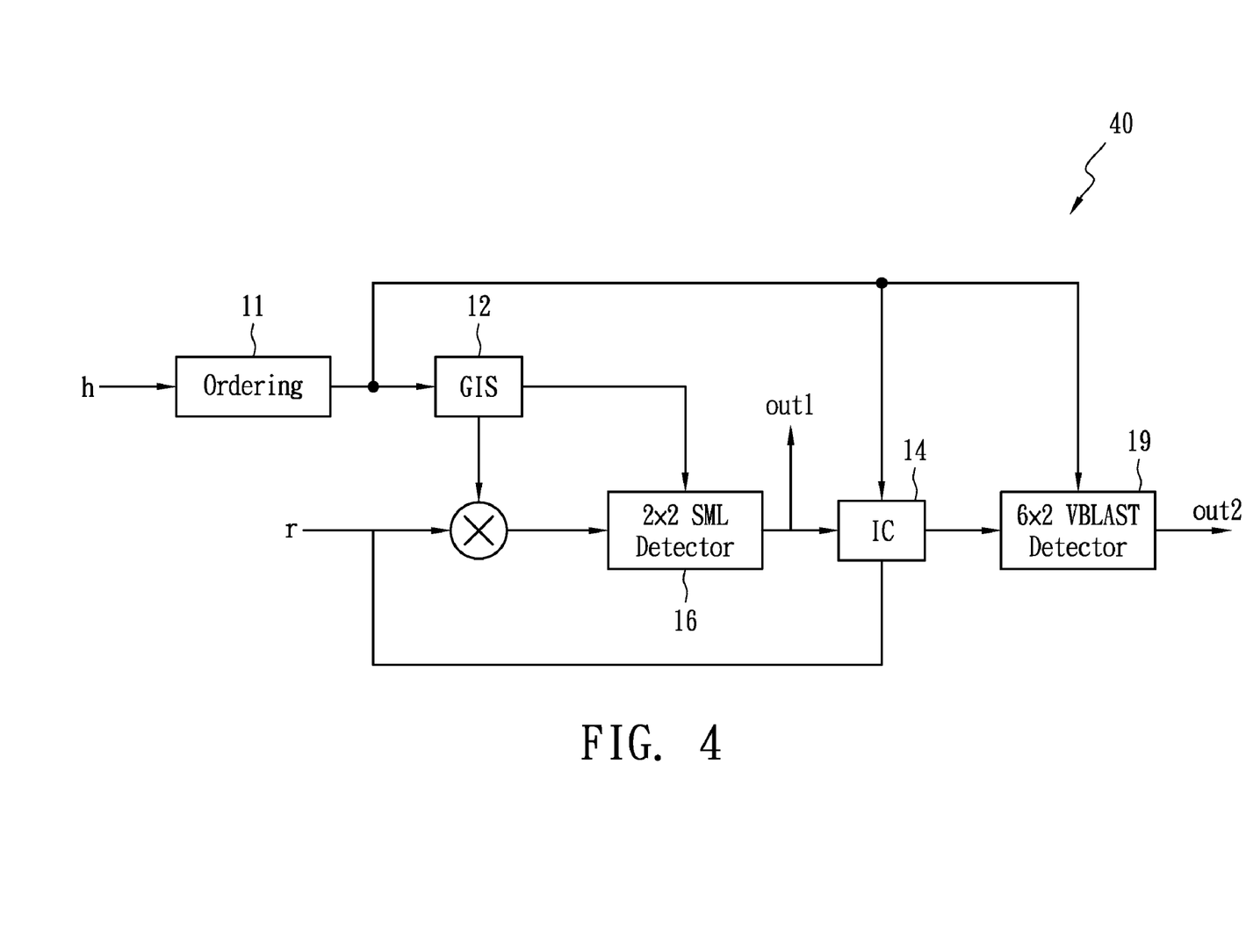
FIG. 4 illustrates a 6×4 MIMO detector in accordance with the present invention.

FIG. 4 illustrates a scalable MIMO detector 40 for a MIMO system comprising six transmitter antennas and four receiver antennas, i.e., a 6×4 system. The scalable MIMO detector 40 uses a 2×2 SML detector 16 as the core detector, and uses a 6×2 VBLAST detector 19 to detect the residual part.

Figure 5:
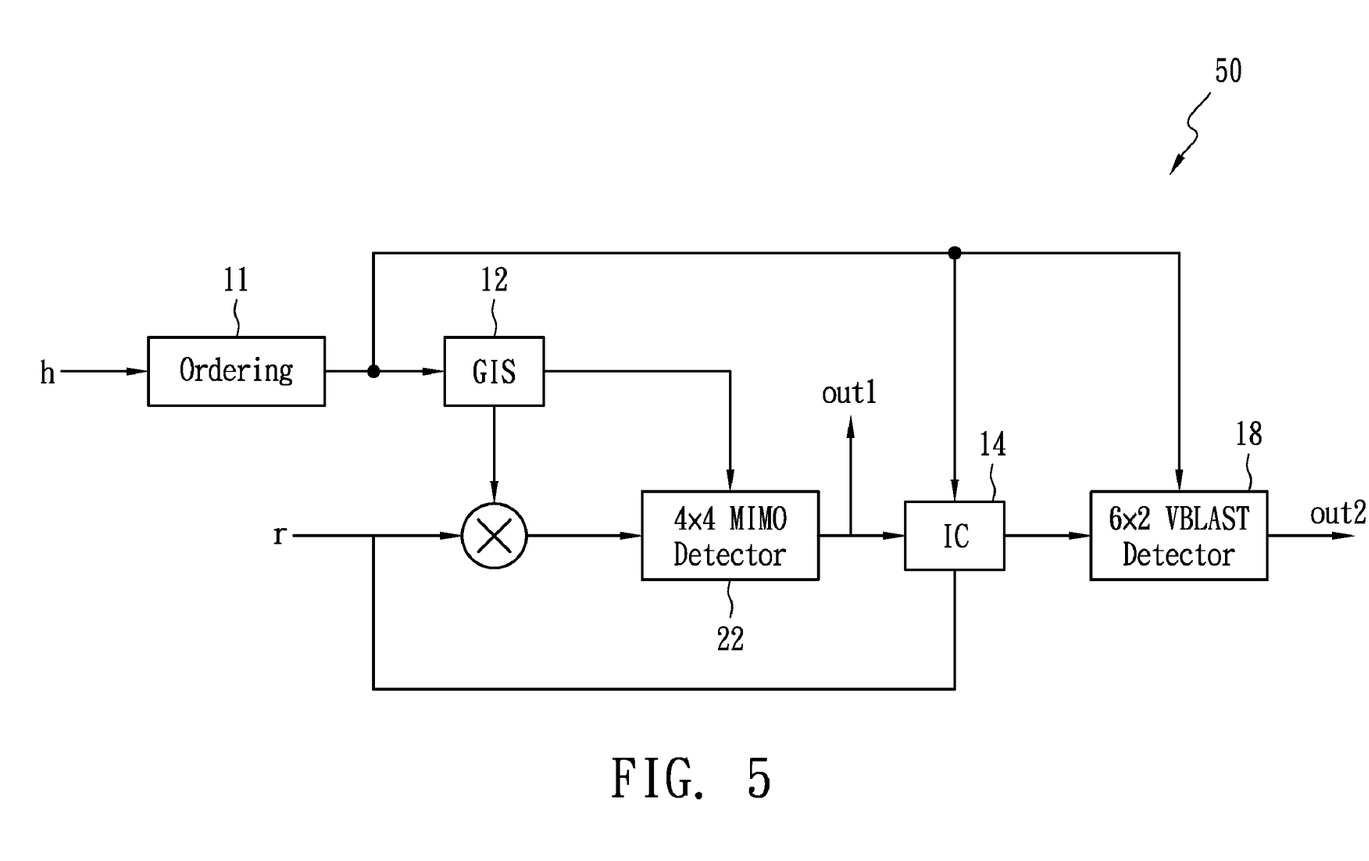
FIG. 5 illustrates a 6×6 MIMO detector in accordance with the present invention.

FIG. 5 illustrates a scalable MIMO detector 50 for a MIMO system comprising six transmitter antennas and six receiver antennas, i.e., a 6×6 system. The scalable MIMO detector 50 uses a 4×4 MIMO detector 22 as the core detector. The 4×4 MIMO detector 22 is substantially equivalent to the MIMO detector 30 shown in FIG. 3, so that the core part is still detected on a basis of a 2×2 SML detector 16. Accordingly, a 6×2 VBLAST detector 18 is configured to detect the residual part.

Figure 6:
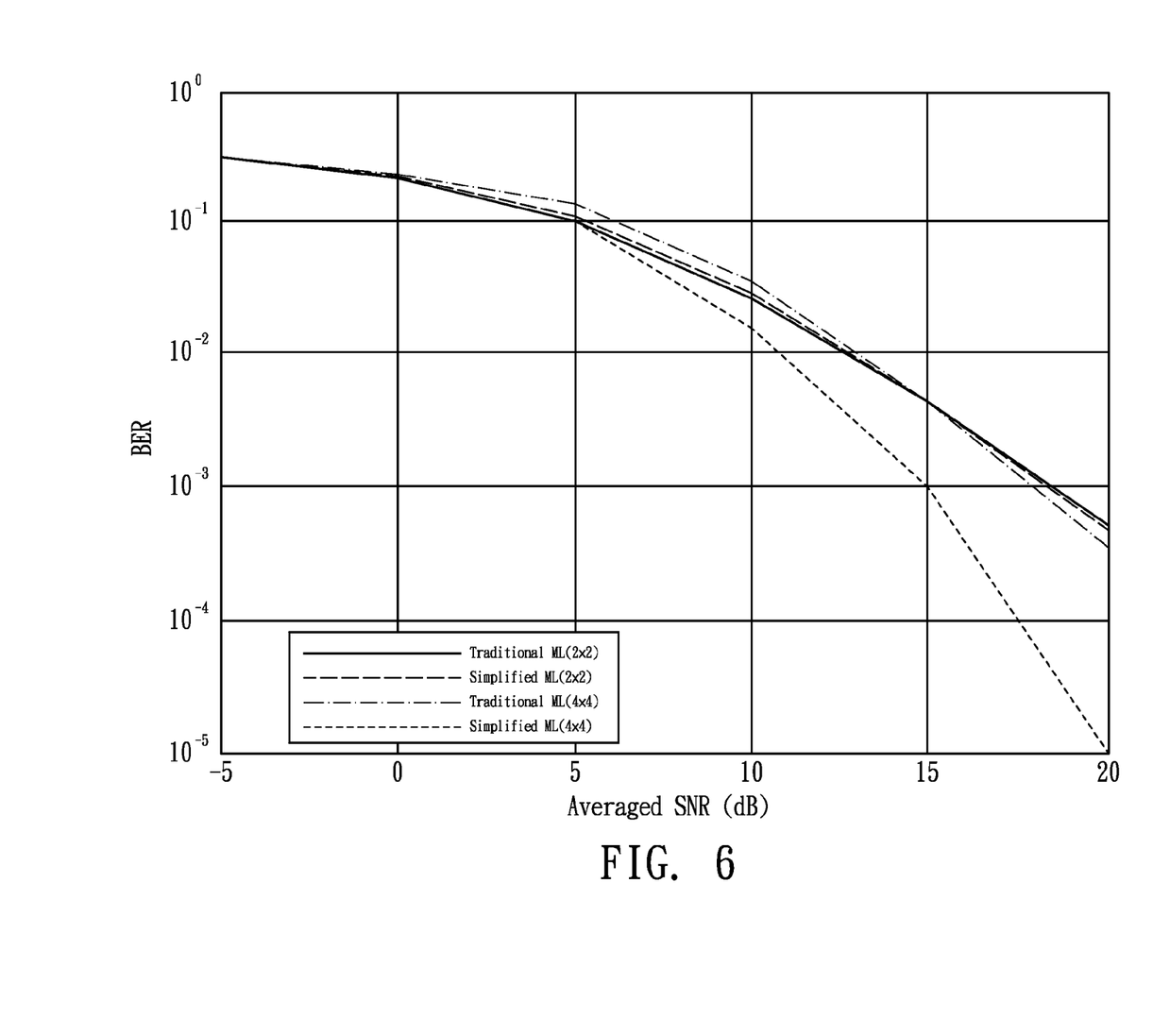
FIG. 6 illustrates the performance comparison between the simplified ML detection of the present invention and the traditional one.

FIG. 6 illustrates the performance comparison between the simplified and traditional 2×2 and 4×4 ML detections, in which the ordinate represents the bit error rate (BER), whereas the abscissa shows the averaged signal-noise ratio (SNR). There is almost no performance difference for 2×2 ML detections. However, the performance gap between the simplified and traditional ML detections will increase with the number of antennas. In other words, the performance of the simplified ML detection of 4×4 is worse than that of the traditional one. Nevertheless, the proposed detector of the present invention only uses 2×2 ML detection, so the performance of the simplified ML detection is equivalent to that of the traditional one.

To sum up, the simplified ML detection can be extended to large number of antennas by iteratively using 2×2 SML detectors as basic units to significantly reduce the complexity. Because the performance of the 2×2 SML detection is equivalent to that of the traditional ML detection, the scalable MIMO detector and the detection method has low complexity without sacrificing performance.

The above-described embodiments of the present invention are intended to be illustrative only. Numerous alternative embodiments may be devised by those skilled in the art without departing from the scope of the following claims.

What is claimed is:

1. A scalable Multiple-Input Multiple-Output (MIMO) detector, comprising:
   an ordering block determining an order of the columns of a channel matrix including received streams based on the power of each column of the channel matrix;
   a group interference suppression block coupled to the ordering block for grouping the received streams into a core part and a residual part, the core part including a first received stream and a second received stream corresponding to the first two columns of the channel matrix in the order, the first received stream and the second received stream forming a received signal vector, and the residual part including the rest of the received streams;
   a core detector coupled to the group interference suppression block for detecting the core part based on a 2×2 Maximum Likelihood (ML) detection; and
   a residual detector detecting the residual part by Vertical Bell Laboratories Layered Space Time (VBLAST) detection.

2. The scalable MIMO detector in accordance with claim 1, further comprising an interference canceling block coupled between the core detector and the residual detector for subtracting the core part from all of the received streams.

3. The scalable MIMO detector in accordance with claim 1, wherein the order of the columns of the channel matrix is descending.

4. The scalable MIMO detector in accordance with claim 1, wherein the magnitude of the column of the channel matrix is proportional to the power of the corresponding received stream.

5. The scalable MIMO detector in accordance with claim 1, wherein the first received stream is transmitted from a first transmitter antenna, and the second received stream is transmitted from a second transmitter antenna, and each of the first transmitter antenna and the second transmitter antenna comprises at least two constellation points.

6. The scalable MIMO detector in accordance with claim 5, wherein core part is detected by the steps of:
   determining a constellation point of the second transmitter antenna most likely corresponding to each constellation point of the first transmitter antenna, and each constellation point of the first transmitter antenna and the corresponding constellation point of the second transmitter antenna thereof form a transmitted signal vector, thereby at least two transmitted signal vector being formed; and
   finding a minimum distance between the received signal vector and multiplication of the channel matrix and each transmitted signal vector, and the transmitted signal vector corresponding to the minimum distance being the solution of core part.

7. The scalable MIMO detector in accordance with claim 6, wherein the received power of the first transmitter antenna is larger than that of the second transmitter antenna.

8. The scalable MIMO detector in accordance with claim 1, wherein the received streams are transmitted through equal to or less than 4 transmitter antennas.

9. A scalable MIMO detector, comprising:
   an ordering block determining an order of the columns of a channel matrix based on the magnitude of each column of the channel matrix;
   a group interference suppression block coupled to the ordering block for grouping received streams into a core part and a residual part, the core part including a first received stream and a second received stream corresponding to the first two large columns of the channel matrix, and the residual part including the rest of the received streams;
   a detector, comprising: a core detector coupled to the group interference suppression block for detecting the core part based on a 2×2 Maximum Liklihood (ML) detection; and a first residual detector coupled to the core detector; and
   a second residual detector detecting the residual part by Vertical Bell Laboratories Layered Space Time (VBLAST) detection.

10. The scalable MTMO detector of claim 9, wherein the received streams are transmitted through equal to or larger than 5 transmitter antennas.

* * * * *

UNITED STATES PATENT AND TRADEMARK OFFICE
CERTIFICATE OF CORRECTION

PATENT NO. : 7,672,390 B2  Page 1 of 1
APPLICATION NO. : 11/463207
DATED : March 2, 2010
INVENTOR(S) : Pin Ma Hsi and Wen Yu Chung It is certified that error appears in the above-identified patent and that said Letters Patent is hereby corrected as shown below:

Title Page, Item (73) Assignee, should read
National Tsing Hua University

Signed and Sealed this

First Day of June, 2010

David J. Kappos
*Director of the United States Patent and Trademark Office*